United States Patent [19]

Moritani

[11] 4,137,676
[45] Feb. 6, 1979

[54] CONTROLLING DEVICE FOR GRINDING PIEZO-ELECTRIC ELEMENT

[75] Inventor: Nakanobu Moritani, Tokyo, Japan

[73] Assignee: Kabushiki Kaisha Seikosha, Japan

[21] Appl. No.: 818,325

[22] Filed: Jul. 22, 1977

[30] Foreign Application Priority Data

Jul. 23, 1976 [JP] Japan .................................. 51-87869
Dec. 29, 1976 [JP] Japan ............................... 51-160453

[51] Int. Cl.² .............................................. B24B 49/04
[52] U.S. Cl. .................................................. 51/165 R
[58] Field of Search ........................ 51/165 R, 165.77

[56] References Cited

U.S. PATENT DOCUMENTS

| 2,340,843 | 2/1944 | Bailey | 51/165 R |
| 3,097,458 | 7/1963 | Richmond | 51/165 R X |
| 3,579,922 | 5/1971 | Mandonas | 51/165 R |
| 3,691,695 | 9/1972 | Green | 51/165 R X |
| 4,063,910 | 12/1977 | Huguenin | 51/165 R |

*Primary Examiner*—Harold D. Whitehead
*Attorney, Agent, or Firm*—Robert E. Burns; Emmanuel J. Lobato; Bruce L. Adams

[57] ABSTRACT

A device for controlling the grinding of a piezo-electric element is designed to convert the frequency of an electric signal produced with grinding of a piezo-electric element into a lower frequency, using frequency converters and a local oscillator and then to select, by means of filters, a frequency generated from the frequency converters at the time when a desired grinding of a piezo-electric element has been obtained so as to bring the grinding operation to a stop in response to the selected signal.

14 Claims, 10 Drawing Figures

CONTROLLING DEVICE FOR GRINDING PIEZO-ELECTRIC ELEMENT

BACKGROUND OF THE INVENTION

Conventionally, to grind a crystal piece for instance to such an extent that it obtains a desired natural frequency, an approximate grinding time required for the crystal piece to reach the thickness for a desired natural frequency is first measured in advance. Then, crystal pieces are mounted on a grinding apparatus to undergo grinding for the period of said measured time, and after that taken out to make measurement of the natural frequency of each crystal piece. If the frequency proves not to have reached the desired natural frequency, regrinding is performed. Therefore, the frequency adjustment requires longer time, and much labor is required since each crystal piece has to be taken out every time measurement of frequency is made.

SUMMARY OF THE INVENTION

The present invention relates to a controlling device for grinding piezo-electric element, which is designed to perform grinding until desired natural frequencies of piezo-electric elements such as crystal pieces are produced.

The major feature of the present invention is to take out an electric signal generated at the time of grinding a piezo-electric element, and to produce a frequency of the difference between a frequency of the electric signal and output frequencies of local oscillators so as to make selection of the frequency of said difference by means of filters at the time when a desired grinding condition of the piezo-electric element has been obtained, thereby stopping the grinding operation in response to the selected output. Accordingly, a frequency selected by the filters is dependent upon the output frequencies of the local oscillators so that the selective frequency is free to be changed by changing the output frequencies of the local oscillators, thus providing greater flexibility in designing the filters. Further, a timer which sends out outputs during the period from the starting of grinding of a piezo-electric element to the moment immediately before a desired grinding condition is reached is provided to eliminate errors in the operation caused by spurious frequencies that are generated during the grinding of a piezo-electric element even when the grinding has been started with rough grinding condition. Furthermore, two filters having equivalent pass damping amount at a desired natural frequency are employed, providing improved selective characteristics of frequencies. Further, two local oscillators having different frequencies are provided so as to allow one filter to make selection of frequencies of two systems, performing timesharing of outputs of a frequency converter.

The first object of the present invention is to provide a new controlling device for grinding piezo-electric element, which is designed to control grinding by detecting a desired grinding condition of a piezo-electric element.

The second object of the present invention is to provide a controlling device for grinding piezo-electric element, wherein a frequency of an electric signal generated with grinding of a piezo-electric element is converted by a frequency converter which receives output frequencies of the local oscillators and then fed to filters to select a desired frequency to detect a desired grinding time by means of the selected output so as to permit free setting of a selective frequency of the filters by setting output frequencies of the local oscillators at appropriate values, thus providing greater flexibility in designing.

The third object of the present invention is to provide a controlling device for grinding piezo-electric elements, wherein need for changing selective frequencies of the filters is eliminated by making variable the output frequencies of the local oscillators, enabling output frequency of the frequency converter to be set in the same conditions as previously stated by changing the output frequencies of the local oscillators when a change has been made in a finally adjusted natural frequency of a piezo-electric element.

The fourth object of the present invention is to provide a controlling device for grinding piezo-electric elements, wherein a timer is provided which produces outputs during the period from the starting of grinding of a piezo-electric element to a moment immediately before a desired grinding time is reached, and by these outputs, errors in operation due to generated spurious frequencies are eliminated.

The fifth object of the present invention is to provide a controlling device for grinding piezo-electric elements, wherein two band-pass filters that exhibit equivalent damping amount at a desired frequency out of the output frequencies of a frequency converter are provided to select a frequency at the time when a desired grinding condition is reached, thus allowing improved selective characteristics of frequency to be achieved.

The sixth object of the present invention is to provide a controlling device for grinding piezo-electric elements, wherein each output of the two band-pass filters is converted to dc voltage to detect a desired grinding condition of a piezo-electric element by means of coincidence of the two so that errors in operation are prevented when the level of an input electric signal varies.

The seventh object of the present invention is to provide a controlling device for grinding piezo-electric elements, wherein the frequency of an electric signal generated with grinding of a piezo-electric element is converted by the outputs of different frequencies sent by the two local oscillators, and the converted frequency undergoes timesharing to go through one filter before being separated into outputs of each system. Then these are converted into dc voltages so as to detect a desired grinding condition by coincidence of the two, thereby providing greater flexibility in designing in terms of the selective frequencies of a filter.

BRIEF DESCRIPTION OF THE DRAWINGS

The nature of the present invention as well as other objects and advantages thereof will become more apparent from consideration of the following detailed description and the accompanying drawing in which.

DESCRIPTION OF THE PREFERRED EMBODIMENTS

Description of a preferred embodiment of the present invention is given hereinafter in reference to the drawings.

Figure 1:
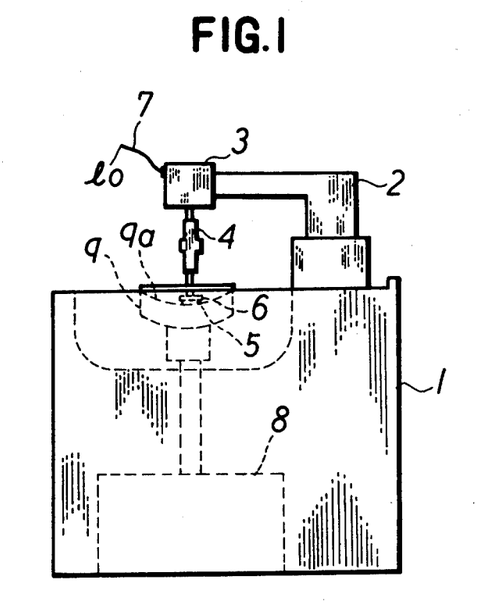
FIG. 1 is an illustrative front view of a grinding apparatus to which the control device of the present invention is applied.
Figure 2A:
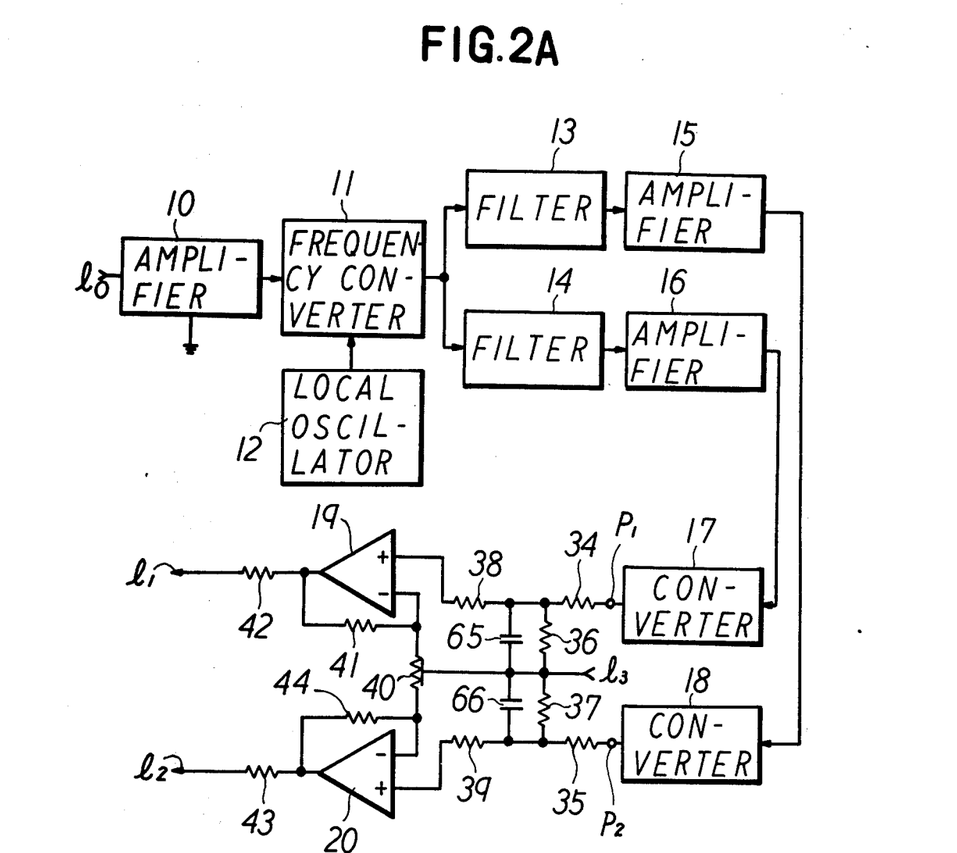
FIGS. 2A and 2B are block diagrams of electric circuits showing one of the preferred embodiments of the present invention.
Figure 2B:
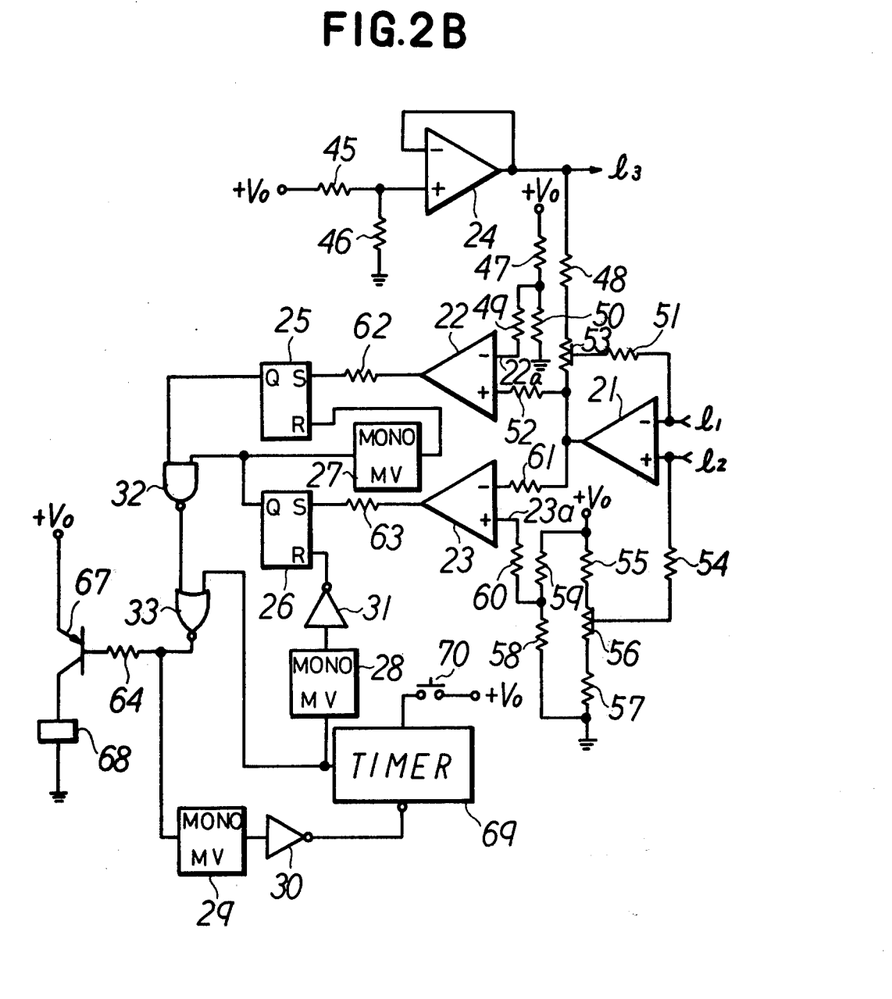

In FIG. 1, a supporting arm 2 is provided on a conductive pedestal 1, and a driving mechanism 3 is provided on the tip thereof. The driving mechanism 3 rotates, through a conductive rotary shaft 4, a conductive fixture 6 whereon a crystal piece 5 is mounted. From a part of the driving mechanism 3, a lead wire 7 is led out which is electrically connected to the fixture 6. A driving mechaism 8 enclosed in the pedestal 1 is designed to rotate and shake a conductive concave-surface lapping machine so as to grind the crystal piece 5 with a concave grinding surface 9a. The lapping machine 9 and the pedstal 1 are electrically connected. Referring to FIGS. 2A and 2B, an amplifier 10 amplifies electric signals fed through the lead wire 7 as the grinding of the crystal piece 5 is performed by the grinding apparatus shown in FIG. 1. A frequency converter 11 produces a frequency output of the difference between the amplifier 10 and a local oscillator 12. The local oscillator 12 consists of, for example, a frequency synthesizer, and a desired frequency can be selectively generated manually. Filters 13 and 14 are band-pass filters which receive outputs from the frequency converter 11 in common, and have their central frequencies of each passing band set at the frequencies $f_2$ and $f_3$ as indicated by the curves a and b in FIG. 3 so as to provide the same damping amount α at the frequency $f_1$. For instance, assuming that a desired natural frequency of the crystal piece 5 is 5MHz and an output frequency of the local oscillator 12 is 4MHz, and then the frequency $f_3$ is set approx. 995KHz, and the frequency $f_2$, at approx. 1005KHz. Amplifiers 15 and 16 are designed to amplify outputs of the filters 13 and 14, and the amplified ac signals are converted into dc voltages by dc converters 17 and 18. Reference numerals 19–24 are operational amplifiers. Reference numerals 25 and 26 represent flip-flop circuits, 27–29 are mono-multivibrators, 30 and 31 are inverters, 32 and 33 are gate circuits, 34–64 are resistors, and, 65 and 66 are capacitors. A relay 68 connected to the collector of a transistor 67 is so designed that the grinding apparatus is driven into operation when it activates.

A timer 69 is set so that while a manually-operated switch 70 is open, the output logical value is "0" but when it is closed the output logical value is reversed to "1" which is maintained for the period T immediately before a piezo-electric element generates a desired natural frequency.

Now, description is given for the operation. To provide the present embodiment, consider that the crystal piece 5 is to be ground until it generates a desired natural frequency fo, and the output frequency $f_L$ of the local oscillator 12 has been established at a frequency of fo + $f_1$, and also the flip-flop circuits 25 and 26 have been set. Accordingly, the output logical value of the gate circuit 33 is kept at "1", and consequently the transistor 67 remains off, resulting in the relay 68 not being in operation.

Figure 4:
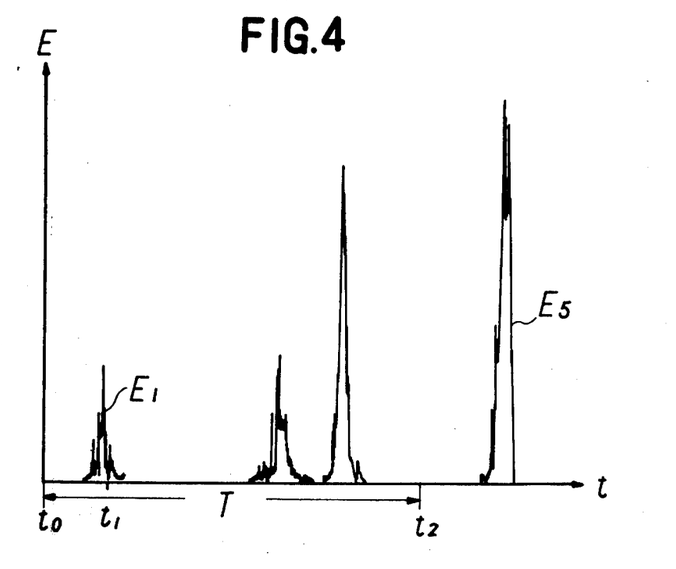
FIGS. 4–6 are diagrams of waveforms produced at major parts in the electric circuit shown in FIG. 2b, wherein the axis of abscissas indicates the time t, and the axis of ordinates, the voltage E.
Figure 5:
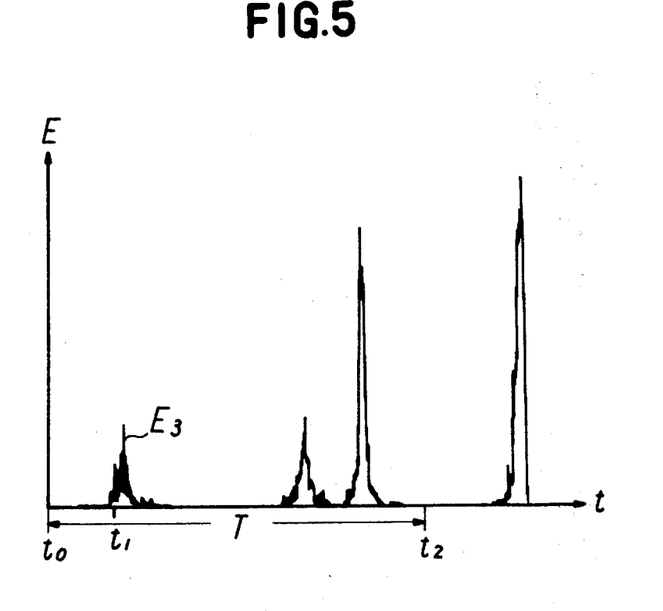
Figure 6:
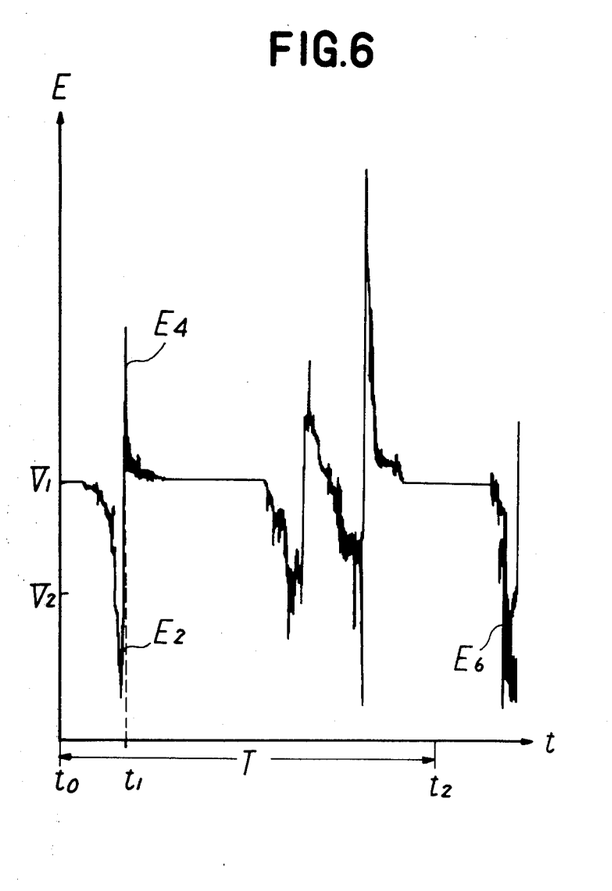

When the manually-operated switch 70 is closed, the timer 69 activates with its output logical value reversed to "1", which causes the output logical value of the gate circuit 33 to become "0", turning on the transistor 67 and driving the relay 68 into operation. Thus, the grinding apparatus shown in FIG. 1 starts its operation. It has been proved that spurious frequencies the same as the desired natural frequency fo may be generated during the period from starting of the grinding of the roughly ground crystal piece 5 until the desired natural frequency fo is produced. And therefore, description is given for the case where spurious frequencies fo are generated. An electrical signal including a spurious frequency fo is amplified by the amplifier 10 shown in FIG. 2A, and the frequency goes through the frequency converter 11 to produce the difference from an output frequency $f_L$ of the local oscillator 12, causing a frequency $f_1$ to be produced in the output of the frequency converter 11. The frequency $f_1$ passes through the filters 13 and 14, and is converted to dc voltage by the dc converters 17 and 18 through the amplifiers 15 and 16, to be finally supplied to the operational amplifiers 19 and 20. Consequently, voltages $E_1$ and $E_3$ of the waveforms shown in FIG. 4 and FIG. 5 are generated at each output of the operational amplifiers 19 and 20. The voltages $E_1$ and $E_3$ further produce voltages $E_2$ and $E_4$ shown in FIG. 6 at the output of the operational amplifier 21, and are fed to the operational amplifiers 22 and 23. The operational amplifier 21 has been so set that it generates a voltage $V_1$ when both inputs have reached an equal voltage level. The input terminal 22a of the operational amplifier 22 has been set at a reference voltage $V_1$, while the input terminal 23a of the operational amplifier 23, at a reference voltage $V_2$ (< voltage $V_1$). As a result, when the voltage $E_2$ reduces below the reference voltage $V_2$, the output logical value of the operational amplifier 23 will become "1" and the flip-flop circuit 26 is set, causing its output Q to be reversed to a logical value "1". Then, the voltage $E_3$ shown in FIG. 5 is generated from the operational amplifier 19, and when it has reached the same level with the output voltage $E_1$ of the operational amplifier 20 in a time $t_1$, the output voltage of the operational amplifier 21 will provide voltage $V_1$ as shown in FIG. 6, further generating the voltage $E_4$. This will cause the output logical value of the operational amplifier 22 to become "1", setting the flip-flop circuit 25. Consequently, the output Q will have a logical value "1", while the output of the gate circuit 32 will have a logical value "0". Now, the output logical value of the timer 69 has been kept to be "1" so that no variation is produced in the output of the gate circuit 33, allowing the grinding apparatus to continue its operation.

Thus, in spite of generation of the spurious frequencies fo, the grinding operation of the grinding apparatus is continued unless the timer 69 changes its output level.

Figure 3:
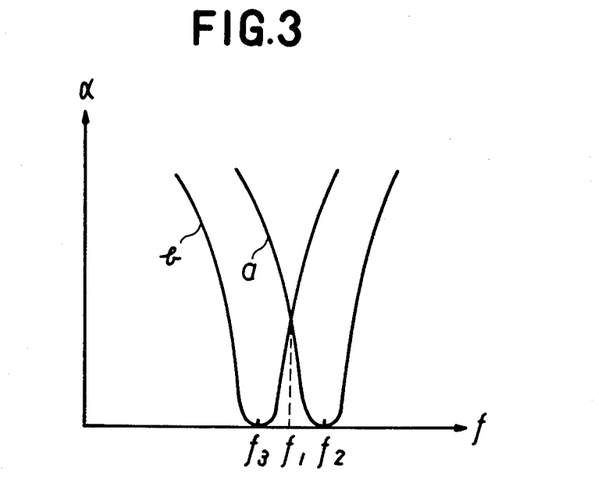
FIG. 3 is a characteristic diagram showing the relation between frequency f and damping amount $\alpha$ of the two filters.

When the period T has lapsed since the starting of grinding, the output logical value of the timer 69 is reversed to "0" and at the same time a mono-multivibrator 28 supplies a pulse of narrow width to reset the flip-flop circuit 26 through the inverter 31. And when the ground crystal piece 5 has approached a desired thickness, the output frequency of the frequency converter 11 will reach $f_3$ which will pass through the filter 14. As a result, a voltage $E_5$ shown in FIG. 4 and a voltage $E_6$ shown in FIG. 6, respectively are generated at each output of the operational amplifiers 19 and 21. This will cause the output logical value of the operational amplifier 23 to be reversed to "1" and the flip-flop circuit 26 to be set, reversing the output Q to a logical value "1". Accordingly, one of the inputs of the gate circuit 32 is kept to provide a logical value of "1", and the level reversion of the output Q of the flip-flop circuit 26 causes the mono-multivibrator 27 to produce a pulse of narrow width, thereby resetting the flip-flop circuit 25. When the crystal piece 5 has been ground to a desired thickness and the natural frequency fo is generated, the frequency converter 11 will provide an output frequency of $f_1$, and the damping amount α of the filters 13 and 14 will become equal as indicated in FIG. 3, resulting in the output logical value of the operational amplifier 22 to be reversed "1" as previously described for the case where a spurious frequency is fo. Therefore, the flip-flop circuit 25 is set, reversing the output Q to have a logical value of "1", which will cause the output logical value of the gate circuit 32 to be reversed to "0". Then the output logical value of the gate circuit 33 will be reversed to "1", turning off the transistor 67, and therefore the relay 68 ceases to operate, causing the grinding apparatus shown in FIG. 1 to stop its operation, thus providing a crystal piece which possesses the desired natural frequency fo.

In the present embodiment, the output frequency of the local oscillator 12 is made variable, which would offer such advantage that filters having prior selective frequencies may be used as they are with the requirement of only changing the output frequency of the local oscillator 12 when the desired natural frequency of a crystal piece is changed. Moreover, any selective frequencies of the filters may be established so that the filters are free to be designed with optimum frequencies.

Making variable the output frequency of the local oscillator 12 provides such advantages described above, however, the output frequency may not necessarily be made variable when a desired natural frequency of a crystal piece is fixed.

In the present embodiment, each output from the filters 13 and 14 is converted to dc voltage to provide a difference in both outputs so that the difference will be zero regardless of variation in the level of electric signals taken out from the grinding apparatus as far as the output variation of the two filters is the same, thus ensuring no error in the operation due to such variation. However, another way is also available whereby the output frequency of the frequency converter is detected through a band-pass filter.

The timer is not necessary if a crystal piece has been ground in advance to such an extent that no spurious frequency is generated.

Now, description of another embodiment is made hereinafter. In this embodiment, electric signals supplied from the lead wire 7 of the grinding apparatus in FIG. 1 as previously described are used.

Figure 7A:
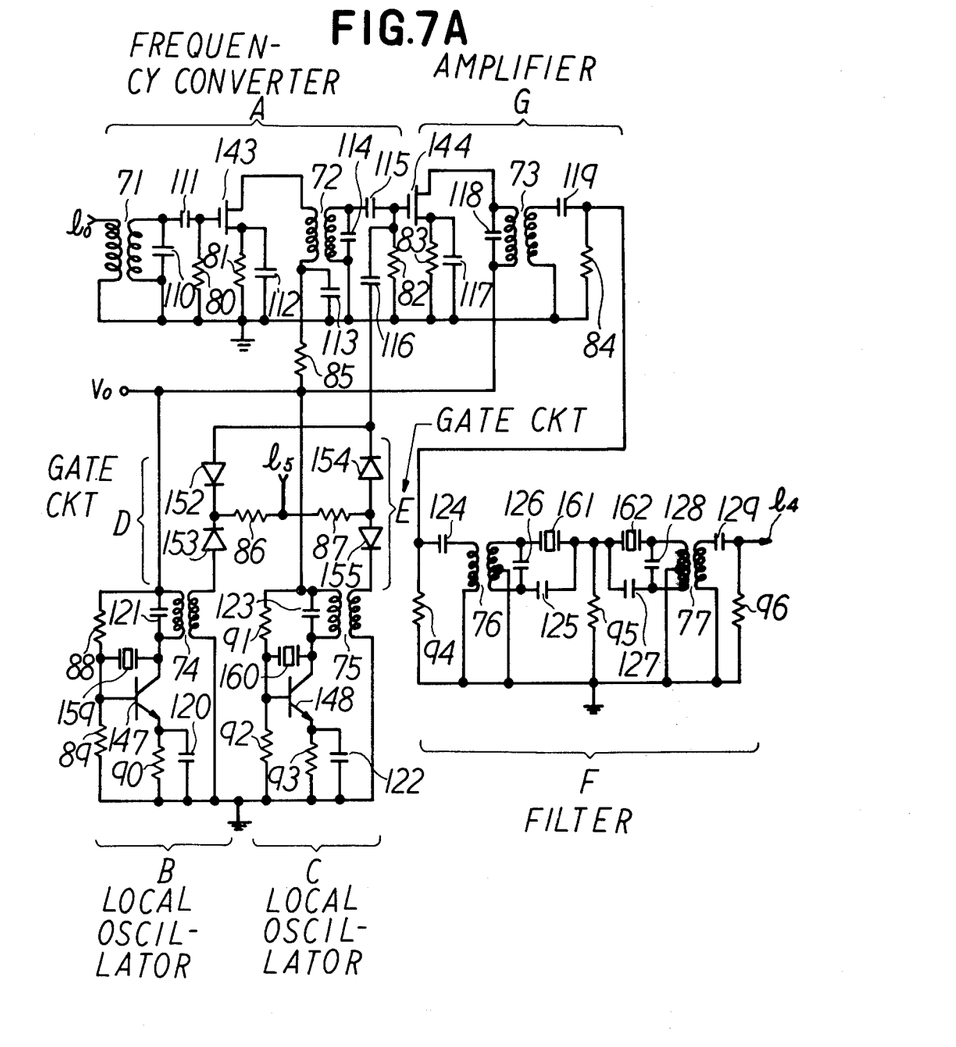
FIGS. 7A and 7B are a circuit diagram of an electric circuit showing the principal parts of another embodiment of the present invention.
Figure 7B:
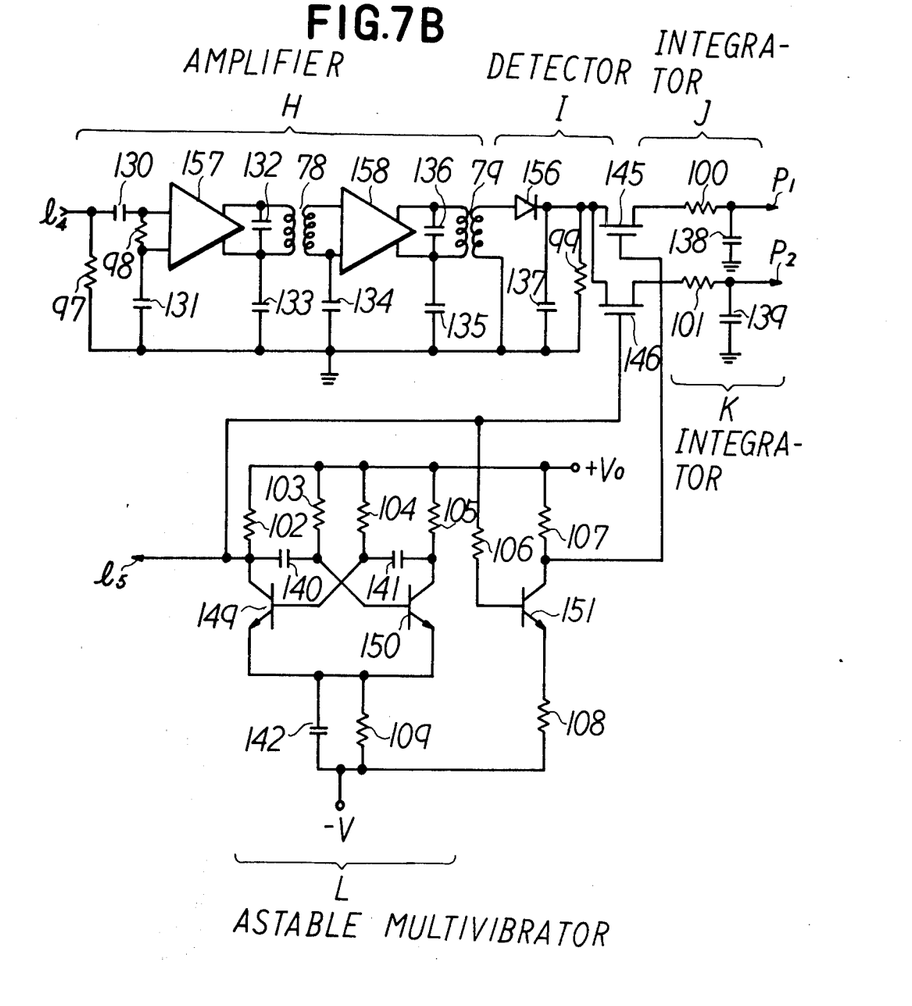

In FIGS. 7A and 7B, the reference numerals 71-79 are transformers, 80-109 are resistors, 110-142 are capacitors, 143-146 are FETs (field effect transistors), 147-151 are transistors, 152-156 are diodes, 157-158 are operational amplifiers, and 159-162 are crystal oscillators. The description is made in reference to the function of a circuitry composed of these circuit elements. The input terminal 10 of a frequency converter A is connected to the lead wire 7 of the grinding apparatus shown in FIG. 1. Local oscillators B and C are connected to the frequency converter A through gate circuits D and E, respectively. The local oscillator B has its output frequency $f_2$ set at $f_2 = fo + f_1 + \Delta f$ ($\Delta f << f_1$), and the local oscillator C has its output frequency $f_3$ set at $f_3 = fo + f_1 - \Delta f$, where the frequency fo represents a desired natural frequency of the crystal piece 5, and the frequency $f_1$ ($<fo$) is a central frequency in the pass band of a band-pass filter F. The output of the frequency converter A is fed through an amplifier G to the filter F. The output of the filter F is supplied to a detector I through an amplifier H to be further converted to dc voltage through integrators J and K. Each output from the integrators J and K is connected to dc converters 17 and 18, and terminals $P_1$ and $P_2$ of the preceding circuit shown in FIG. 2A. An astable multivibrator L forms a generator of timing pulses, and its oscillating frequency has been set far below the frequency $f_1$.

Figure 8:
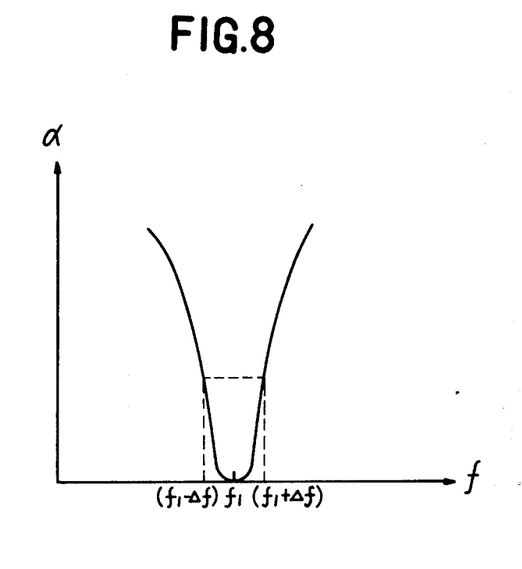
FIG. 8 is a characteristic diagram showing the relation between frequency f and damping amount α of the filters.

Now, description is made in reference to the operation. The same description as that for the prior embodiment is applied to the operations until the manually-operated switch 70 shown in FIG. 2B is closed to activate the timer 69, driving the grinding apparatus into operation. Electric signals which are generated at the lead wire 7 in FIG. 1 with the starting of the grinding apparatus are supplied to the input terminal 10 of the frequency converter A shown in FIG. 7A, while gate circuits D and E are switched on and off alternately by means of the timing pulse from the astable multivibrator L. Accordingly, the frequency signal of the difference between the frequency of said electric signal and each frequency of the local oscillators B and C synchronizes with the timing pulse and appears from the frequency converter A in a timesharing manner. Each timeshared frequency signal is fed to the filter F through the amplifier G. If the natural frequency of the crystal piece 5 is not equal to the desired frequency fo, the signal is not allowed to pass through the filter F. As already described in the prior embodiment, however, spurious frequencies which are the same as the desired natural frequency fo may be generated until the desired natural frequency fo is generated. When the spurious frequency fo is produced, a frequency of $f_1 + \Delta f$ is generated in the output of the frequency converter A when a frequency $f_2$ is supplied to the frequency converter A from the local oscillator B, while a frequency of $f_1 - \Delta f$ is generated in the output of the frequency converter A when a frequency $f_3$ is supplied from the local oscillator C. Therefore, as indicated by the characteristics in FIG. 8, the filter F provides equivalent damping amount for each frequency, generating signals equivalent to the outputs. These equivalent signals are fed to the amplifier H and a detector I in a timesharing manner. The FETs 145 and 146 are turned on and off by means of the timing pulses from the astable muoltivibrator L, and this is synchronized with the switching on and off of the gate circuits D and E so that when the gate circuit D is opened by the timing pulse, a detecting output of the frequency $f_1 + \Delta f$ passes through the FET which has been turned on and then is converted to dc voltage by the integrator J. When the FET 146 is turned on, a detecting output of the frequency $f_1 - \Delta f$ will pass and is converted to dc voltage by the integrator K. The outputs of the integrators J and K, respectively, are supplied to the operational amplifiers 19 and 20 shown in FIG. 2A. Description of the operations hereafter is omitted since it is the same as that of the prior embodiment.

In the present embodiment, timesharing is employed for the frequencies of the two systems so that only one filter is required, and further the use of local oscillators provides greater flexibility in designing a filter. Other aspects give the same advantages as those of the prior embodiment.

Description is limited to a crystal piece in the above embodiments, however, the piezo-electric element may also be of lithium tantalate, barium titanate, etc.

What we claim is:

1. A controlling device for grinding piezo-electric element comprising:
   detecting means for detecting an electric signal produced at the time of grinding a piezo-electric element;
   local oscillating means;
   a frequency convertor for generating a frequency of the difference between the output frequency of the local oscillating means and the frequency of the electric signal;
   filter means for making selection of frequencies generated from the frequency convertor when a desired grinding condition of a piezo-electric element has been reached; and
   controlling means for stopping grinding of the piezo-electric element in response of the output of the filter means.

2. A controlling device for grinding piezo-electric element as claimed in claim 1, wherein the output frequency of the local oscillating means is made variable.

3. A controlling device for grinding piezo-electric element as claims in claim 1, including a timer which produces a signal to allow the grinding operation to be continued independently of the outputs given by the filter means during the period from the beginning of the grinding of a piezo-electric element to the moment immediately before a desired grinding condition is reached.

4. A controlling device for grinding piezo-electric element as claimed in claim 1, wherein the filter means consists of two band-pass filters having equivalent damping amount at a natural frequency which is generated at the time when a desired grinding condition of a piezo-electric element has been reached.

5. A controlling device for grinding piezo-electric element as claimed in claim 4, including means for converting the outputs of the two band-pass filters to dc voltages, respectively, to detect coincidence of the both dc voltages.

6. A controlling device for grinding piezo-electric element comprising:
   detecting means for detecting an electric signal generated at the time of grinding;
   two local oscillators including, as their components, a natural frequency generated at the time when a desired grinding condition of a piezo-electric element has been reached and having a difference in frequency with each other;
   first means to produce the output frequency of each local oscillator in a manner of timesharing;
   a frequency converter for producing a frequency of the difference between the output frequency of the first means and the output frequency of the detecting means;
   a filter which provides equivalant damping amount for each frequency undergone timesharing when it is generated from the frequency convertor at the time when a desired grinding condition of a piezo-electric element has been obtained;
   second means to separate for each system the output of the filter, which has undergone timesharing;
   third means to convert the outputs of the two systems, which have been separated by the second means, into dc voltages;
   fourth means to compare both dc voltages of the third means and to produce an output when they coincide with each other; and
   fifth means to bring the grinding operation to a stop in response to the fourth means.

7. A controlling device for grinding piezo-electric element as claimed in claim 6, comprising:
   a timer which times the period from the starting of grinding to the moment immediately before a desired grinding condition of a piezo-electric element is reached; and
   sixth means to stop the grinding operation by means of the output given by the fourth means after the timer has completed its timing.

8. A controlling device for grinding piezo-electric element as claimed in claim 6, wherein the first means consists of gate circuits provided corresponding to outputs of each local oscillator, and a generator of timing pulses for switching on and off alternately these gate circuits.

9. A controlling device for grinding a piezo-electric element to such extent that it produces a desired natural frequency comprising:
   detecting means for picking up frequency signals produced by a piezo-electric element when being ground;
   means for generating a frequency output having a predetermined relation to said desired natural frequency;
   frequency converter means receiving said frequency signal and said generated frequency output and generating an output of the difference of said frequency signal and said generated frequency;
   first and second band-pass filter means receiving the output of said frequency converter means and passing first and second frequencies equally above and below a frequency corresponding to said desired natural frequency;
   first and second dc converting means for converting the outputs of said first and second filter means respectively to dc voltages;
   means for comparing the output of said first dc converting means with the output of said second dc converting means, and
   controlling means for stopping the grinding of said piezo-electric element in response to a predetermined output of said comparing means.

10. A controlling device as claimed in claim 9, further comprising a timer for allowing the grinding operation to continue independently of the output of said comparing means during a period from the beginning of the grinding of said piezo-electric element to the moment immediately before a desired grinding condition is reached.

11. A controlling device as claimed in claim 9, wherein the output frequency of said frequency generating means is manually variable.

12. A controlling device for grinding a piezo-electric element to such extent that it produces a desired natural frequency, comprising:

detecting means for picking up frequency signals produced by a piezo-electric element when being ground;

first and second oscillator means for generating two different frequency outputs having specific relations with a predetermined frequency from said detecting means;

frequency converter means receiving said frequency signal from said detecting means;

first gate means for connecting the outputs of said first and second oscillator means alternately to said frequency converter means, whereupon said frequency converter means serially produces frequency outputs which are the difference between the frequency signal from said detecting means and the frequency outputs of said first and second oscillator means respectively;

band-pass filter means connected to the output of said frequency converter means, said band-pass filter means having an equivalent damping amount for the two different frequency outputs from said frequency converter means when a desired grinding condition of said piezo-electric element has been obtained;

first and second dc converting means for converting the outputs of said filter means to dc voltages;

second gate means for alternately connecting said first and second dc converter means alternately to the output of said band-pass filter means in synchronism with said first gate means;

means for comparing the outputs of said first dc converting means with the output of said second dc converting means, and controlling means for stopping the grinding of said piezo-electric element in response to a predetermined output of said comparing means.

13. A controlling device as claimed in claim 12, further comprising astable multivibrator means connected with and controlling said first and second gate means.

14. A controlling device as claimed in claim 12, further comprising a timer for allowing the grinding operation to continue independently of the output of said comparing means during a period from the beginning of the grinding of said piezo-electric element to the moment immediately before a desired grinding condition is reached.

* * * * *